Patented Nov. 20, 1951

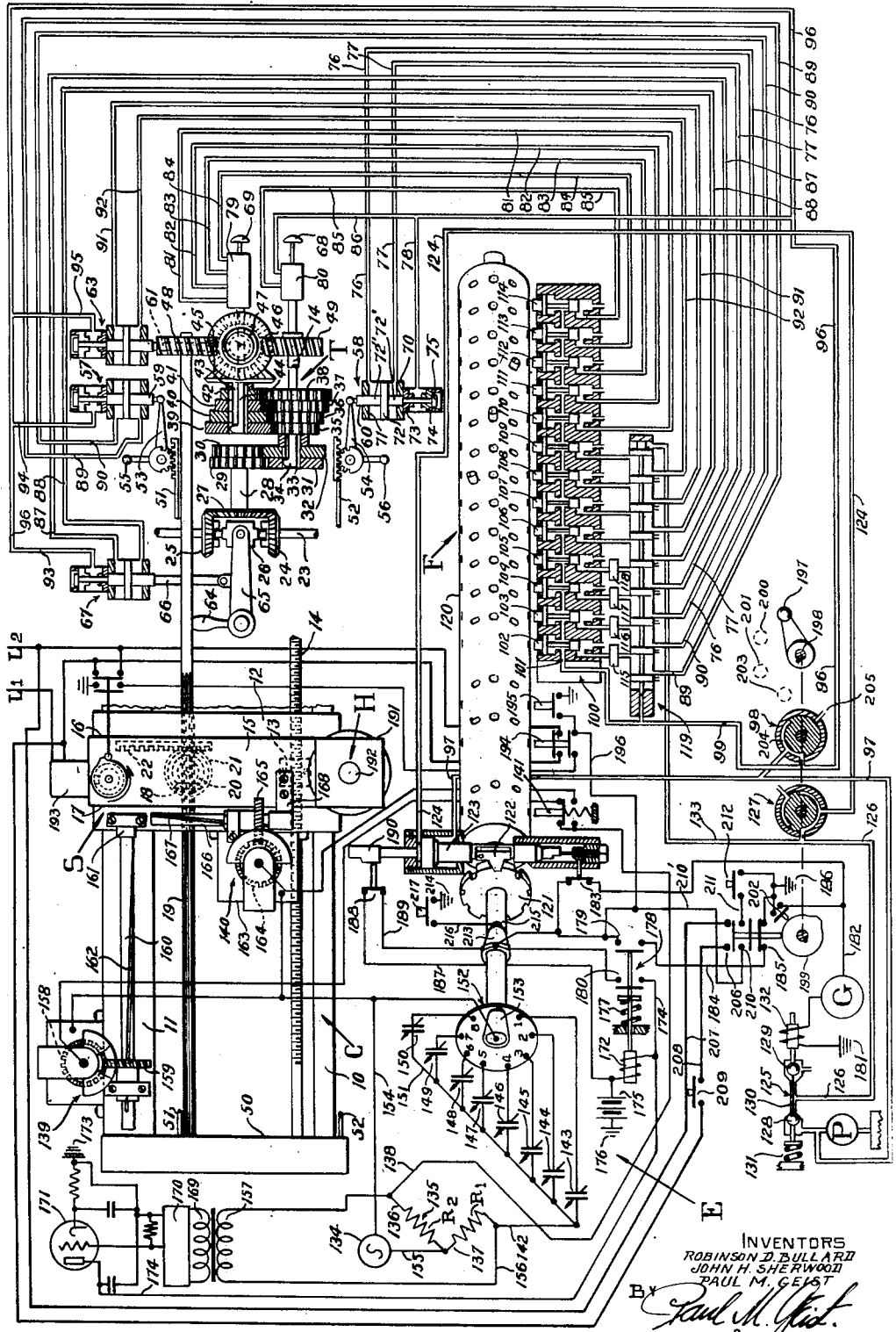

2,575,792

UNITED STATES PATENT OFFICE 2,575,792

CONTROL MECHANISM

Robinson D. Bullard, Greens Farms, and John H. Sherwood and Paul M. Geist, Fairfield, Conn., assignors to The Bullard Company, a corporation of Connecticut Application August 26, 1944, Serial No. 551,328

24 Claims. (Cl. 192—142)

1

This invention relates to controls for apparatus capable of producing a relatively large number of functions. Particularly, it relates to a control mechanism that will automatically select, in any order within a cycle of operation, any one or more functions of which an apparatus is capable, while providing separate electronically-controlled means for very accurately determining the extent of said functions.

Objects of the invention include, the provision of apparatus for moving a member in space, and an electronically-controlled means for accurately stopping the motion of the member at any point in space; the provision of apparatus for moving a member along one or more paths, and an electronic circuit responsive to the arrival of the member at any pre-determined point in any of its paths for stopping the movement of the member; the provision of such an apparatus in which a member can be moved a plurality of times along the same path for different overlapping distances and separate portions of the electronic circuit are effective for each movement accurately to stop the member at any pre-determined point in its path of movement; the provision of an apparatus for remotely controlling the accurate stopping of the movement of a member; the provision of apparatus capable of performing a relatively great number of functions, a pre-settable device for selecting any of the functions successively within a cycle of operation and separate electronically-controlled means for each function of the cycle for starting the next succeeding function upon the completion of the last preceding function; the provision of electronically-controlled apparatus for remotely controlling the accurate movement of a member; the provision of a remotely-operable electronic servo-motor device for causing movement of a member in proportion to the movement of a remotely-operable control therefor; and the provision of a machine tool including a turret tool support, a work support, and means for moving one of said supports in either direction along a plurality of paths at a plurality of speeds and a control for selecting the path, direction and speed of movement of the movable support for performing successive functions within a cycle of operation, including electronically-controlled means for each function in the cycle for causing the control to start the next succeeding function at the completion of the last preceding function.

The above, as well as other objects and novel features of the invention will become apparent from the following specification and accompanying drawing, in which:

2

The figure is a schematic layout of the essential features of the invention.

Referring to the drawing, the invention is shown as applied to certain parts of a vertical turret lathe including a cross rail C along which a saddle S is adapted to be moved. The saddle S supports a slide including a turret head H for movement at right angles to the movement of the saddle S along the cross rail C. The turret head H is adapted to be moved along the two right-angular paths relatively to a work support (not shown) by the selective operation of a feed-works transmission T. A function control F is adapted to be pre-set for causing the transmission T successively to move the head H along either of its paths of motion at any desired speed and in either direction to perform a cycle of operation. An additional control comprising an electronic circuit E is provided for accurately stopping the movement of the head H when it has arrived at the desired point in its paths of travel and for causing the control F to start the next succeeding function of the head H within the cycle of operation at the completion of the preceding movement of the head H.

The cross rail C comprises spaced, horizontally-disposed bearings 10 and 11 along which the saddle S is adapted to be moved. The saddle S comprises a body 12, to the back of which a threaded boss 13 is fixed that receives an axially-fixed screw 14. Accordingly, rotation of the screw 14 in either direction causes movement of the saddle 12 in either direction along the bearings 10 and 11. A slide 15 is mounted between bearings 16 and 17 on the saddle 12 for movement at substantially right angles to the movement of the saddle 12 along the cross rail C. A bevel gear 18 is splined to a rotatable, axially-fixed shaft 19. Gear 18 is fixed to the saddle 12 for movement therewith and meshes with a gear unit including a bevel gear 20. The gear unit also includes a spur gear 21 which meshes with a rack 22 on the back of the slide 15. Accordingly, rotation of the splined shaft 19 in either direction causes the head H to move along the bearings 16 and 17 of the saddle 12.

Rotation of the screw 14 and the splined shaft 19 is accomplished by the operation of the transmission T. The transmission T includes a shaft 23 that is driven by means which drives the work support of the apparatus (not shown) in the same way that the work support is driven in application Serial Number 541,986 filed June 24, 1944 in the name of Edward P. Bullard, III, now Patent No. 2,528,736, issued Nov. 7, 1950. The shaft 23 supports two bevel gears 24 and 25 for free rotation. A clutch 26 is located between the gears 24 and 25 and is splined to the shaft 23. Both gears 24 and 25 mesh with a bevel gear 27 fixed to a shaft 28. Spur gears 29 and 30 fixed to shaft 28 mesh with corresponding spur gears 31 and 32, journaled on a shaft 33. The shaft 33 is hollow for receiving a diving key 34. The key 34 is adapted to be moved from engagement with the gear 31 to engagement with the gear 32 selectively for a purpose to be described later. Spur gears 35, 36, 37 and 38 are fixed to the tubular shaft 33 and mesh with corresponding spur gears 39, 40, 41 and 42 journaled on another shaft 43. The portion of shaft 43 on which the gears 39 to 42 are journaled is of tubular construction for receiving a diving key 44. A bevel gear 45 is fixed to shaft 43 and meshes with a bevel gear 46, fixed to a worm 47. A worm gear 48 is fixed to the splined shaft 19, and a similar worm gear 49 is fixed to the screw 14. Accordingly, it is evident that worm 47 may be rotated in either direction at any one of eight different speeds, depending upon the positions of the diving keys 34, 44 and the clutch 26. Furthermore, the head H can be moved in either direction along either of its paths of motion by raising or lowering the worm 47 into engagement with the worm gears 48 or 49.

A housing 50 is attached to the end of the cross rail C opposite that which supports the feedworks T. This housing is adapted to support continuously-driven, oppositely-rotatable means adapted to be connected to, and disengaged from the screw 14 and the splined shaft 19 through the selective operation of rods 51 and 52. Crank arms 53 and 54, having hand levers 55 and 56 are provided for operating rods 51 and 52. This construction provides means for moving the turret head H along either of its paths at a relatively fast traverse speed. Crank arms 53 and 54 are also adapted hydraulically to be actuated by pistons within cylinders 57 and 58. The pistons within these cylinders are connected to the arms 53 and 54 by connecting rods 59 and 60.

The worm 47 is adapted manually to be moved into and out of engagement with the gears 48 and 49 by a hand lever (not shown), fixed to a connecting rod 61. The connecting rod 61 is attached to a piston within a cylinder 63. The clutch 26 is adapted manually to be moved by a hand lever 64 through an arm 65. The arm 65 is connected to a rod 66 that is attached to a piston within a cylinder 67. The piston and cylinder mechanisms 57, 58, 63 and 67 are identical with corresponding cylinder and piston mechanisms for moving the identical parts shown in application Serial No. 541,986 filed June 24, 1944, in the name of Edward P. Bullard, III, now Patent No. 2,528,736.

The cylinder 58 includes a dividing partition 70 that cooperates with an end 71 to provide a cylinder for a piston 72. The piston 72 includes a rod 72' that extends through the partition 70 and a rod 72'' that extends through the end portion 71. The rod 72' is reduced in diameter and passes into another portion of the main cylinder 58. Oppositely-disposed discs 73 and 74 are mounted on the rod 72' for free movement relatively thereto. A nut 75 is screwed onto the end of rod 72' in abutting relation with disc 74. The disc 73 abuts against the shoulder formed between the rod 72' and its reduced diameter portion. It also abuts against the partition 70. Fluid under pressure is adapted selectively to be admitted to opposite faces of the piston 72 through conduits 76 and 77. Pressure is at all times adapted to be supplied through a conduit 78 to the cylinder containing the discs 73 and 74. The effective pressure area of the discs 73, 74 is less than the effective pressure area of the piston 72. Consequently, admission of pressure to the cylinder 58 through the lines 76 and 77 will cause the piston 72 to move within the cylinder 58. Removal of pressure from both lines 76 and 77 will effect the instantaneous centralization of the piston 72 within the cylinder 58. This construction provides means for positively moving the crank arm 54, and identical mechanism is employed to move arm 53, clutch 26 and worm 47 to their active positions and causes neutralization of these elements upon removal of the pressure from the corresponding pistons thereof.

The diving key 34 is adapted manually to be moved by a hand lever 68, while the diving key 44 is adapted manually to be moved by a hand lever 69. These keys are adapted hydraulically to be actuated by cylinder mechanisms 79 and 80. The cylinder mechanisms are identical with the corresponding mechanisms shown and described specifically in the above-referred-to application Serial Number 541,986. Fluid under pressure admitted to line 81 alone will cause key 44 to engage gear 42; fluid under pressure admitted simultaneously to the conduits 81 and 83 will locate the key 44 in engagement with the gear 41; simultaneous admission of fluid under pressure to the conduits 84 and 82 will cause the key 44 to engage the gear 40; and admission of fluid under pressure to the conduit 84 alone will locate the key 44 in engagement with the gear 39.

The cylinder 80 is provided with two conduits 85 and 86. Admission of fluid under pressure to the conduit 85 positions key 34 in engagement with gear 32; while release of pressure from conduit 85 causes key 34 to become engaged with gear 31, all as more fully disclosed and described in application Serial No 541,986, above referred to.

Fluid under pressure is adapted selectively to be supplied to the piston mechanism 67 through conduits 87 and 88. Fluid pressure is adapted to be supplied to the piston mechanism 57 through conduits 89 and 90. Fluid under pressure is adapted to be supplied to the piston mechanism 63 through the conduits 91 and 92. Fluid under constant pressure is adapted to be supplied to piston mechanisms 67, 57 and 63 through conduits 93, 94 and 95, respectively. This constant pressure fluid is supplied to the conduits 93, 94 and 95, as well as to the conduit 78 by a line 96 that leads from a main source of fluid supply P through a duct 97 and a valve 98.

Conduits 76, 77, 81, 82, 83, 84, 85, 87, 88, 89, 90, 91 and 92 are adapted to be supplied with fluid under pressure from the main source P through line 97, the valve 98 and a line 99. The line 99 is connected to an elongated valve body 100, that is provided with a centrally-disposed, longitudinally-extending passage 101 throughout its entire length. Valve body 100 is also provided with a plurality of transversely-disposed valve chambers of identical construction within which are located valve plungers 102 to 114, inclusive, for the conduits 76, 77, 81, 82, 83, 84, 85, 87, 88, 89, 90, 91 and 92. The construction and operation of the valves 102 to 114 are identical with corresponding valves in the above-referred-to co-pending application, to which application reference is directed for details of construction. Suffice it to say that depression of any of the valves 102 to 114 will permit fluid under pressure in the conduit 101 to be admitted to the corresponding conduits 76, 77, 81, 82, 83, 84, 85, 87, 88, 89, 90, 91 and 92. For the reasons set forth in the above-referred-to application, time delay devices 115, 116, 117 and 118 are provided between the valve body 100 and the conduits 76, 77, 89 and 90 for delaying the action of the piston mechanisms 57 and 58 and hence the traverse operations of the head H. Additionally, to insure instantaneous exhaust of all of the piston mechanisms 57, 58, 61, 63 upon the completion of a motion of the head H, an exhaust valve mechanism 119 is provided that operates in an identical manner with corresponding exhaust mechanism shown, described and claimed in the above-referred-to co-pending application. Suffice it to say that fluid under pressure from the conduit 99 normally urges all of the piston mechanisms within the device 119 to the right, as viewed in the drawing, and upon the completion of any movement of the head H, all of these piston devices will be moved leftwardly, as will be described later.

The valves 102 to 114, inclusive, are adapted selectively to be depressed by the action of adjustably-mounted dogs on a drum 120 that is adapted to be indexed step-by-step about a horizontal axis, all as more fully disclosed and described in the above-referred-to co-pending application. The drum 120 is adapted to be indexed a pre-determined number of degrees about its horizontal axis intermittently so that the dogs located in a longitudinally-disposed row of openings on the drum will become effective to depress selected valves 102 to 114. Thus, the drum 120 is made up of a plurality of portions each comprising one of the longitudinally disposed rows of openings by each of which a valve or switch-actuating dog may be attached to the drum. A ratchet wheel 121 is fixed to the shaft supporting drum 120 for indexing the drum 120 from station to station. The ratchet wheel 121 is provided with a plurality of circumferentially-disposed ratchet teeth adapted to cooperate with a pawl 122 fixed to a reciprocable piston 123. The cylinder within which piston 123 is adapted to be reciprocated is connected to the line 97 at its one end, and to a line 124 at its other end. Fluid from source P is adapted to pass through a valve mechanism 125, a conduit 126, a valve 127 to the line 124. The effective area of the piston 123 that is affected by the fluid from duct 97 is substantially less than the effective area affected by the fluid from line 124. Accordingly, although constant pressure from the line 97 always urges piston 123 upwardly, as shown in the drawing, admission of fluid under pressure to the line 124 will cause the piston 123 to move downwardly, whereupon the pawl 122 will index the ratchet 121 so that the drum 120 is moved from its one station to its next succeeding station thereby to initiate a succeeding pre-determined function of the head H.

The valve 125 includes two balls 128 and 129 joined by a slender rod 130. The unit including the two balls 128 and 129 is normally urged rightwardly, as viewed in the drawing, by a spring 131. Movement of the unit including the balls 128 and 129 to the left is effected by the energization of a solenoid 132 to be described later. Upon movement of the balls 128, 129 to the left, fluid under pressure from the source P is adapted to flow through the line 126 to the valve 127, thence to the line 124 to the upper end of the cylinder including the piston 123, thereby causing the downward movement of piston 123 and the indexing of the ratchet 121 and with it drum 120. A line 133, extending from the line 126, is connected to the end of valve mechanism 119 opposite that to which line 99 is connected. Accordingly, upon energization of solenoid 132, the valve mechanism 119 is actuated independently of the indexing of the drum 120. This operation of the valve mechanism actually occurs prior to the indexing of drum 120 and instantly upon the head H arriving at a pre-determined position incident to the function just completed. Accordingly, instantly upon valve mechanism 119 being actuated, all of the piston mechanisms 67, 57, 63 and 58 are exhausted and neutralized by their constant neutralizing pressure mechanism.

That which has been described comprises selectively-operable mechanism for causing the head H to produce any function of which it is capable in accordance with the operation of the valves 102 to 114. The extent of any function selected by the drum 120, or the stopping of the head at predetermined points in its paths of travel is adapted to be determined by mechanism associated with the movable head H. This mechanism is designed to provide a separate function-determining means for each function called for by the setting of dogs along a longitudinally-disposed row of openings on the drum 120. It comprises an electronic variable impedance bridge circuit and in the present embodiment, an electronic circuit including a variable capacitance bridge is shown and described.

A source of alternating current 134 at audio frequency is connected across a capacitance bridge 135 including four legs. Legs 136 and 137 of the bridge 135 include resistances $R_1$ and $R_2$ of equal value. The leg 138 of the bridge 135 is adapted to include either one of two variable impedances as for example plate-type condensers 139 and 140. Condenser 139 is operated in response to the movement of the saddle S along the bearings 10 and 11 of the cross rail C, while condenser 140 is adapted to be operated in response to the movement of the head H and slide 15 along the bearings 16 and 17 in the saddle 12. The condensers 139 and 140 are adapted selectively to be connected into the leg 138 of the bridge 135 through a switch 141. Switch 141 is normally urged in a direction to include condenser 139 into the circuit of the leg 138, but when a dog on the drum 120 cooperates with the switch 141, the condenser 139 is cut out of the circuit and the condenser 140 is connected into the leg 138 of the bridge 135. The final leg 142 of the bridge 135 includes a plurality of separate impedances and in the present embodiment they comprise condensers 143 to 150, inclusive, so that each may selectively be connected into the leg 142 by means to be described later. The conductor 151 that is common to one side of each of the condensers 143 to 150 is connected to the leg 142, while the opposite side of each of said condensers is connected respectively to contact points 1 to 8, inclusive, of a distributor 152. The distributor 152 includes an arm 153 that is fixed to the shaft on which the drum 120 is fixed. Accordingly, arm 153 is indexed step-by-step simultaneously with the indexing of the drum 120. Although only eight contacts are shown on the distributor 152 corresponding to eight longitudinally - disposed, peripherally - arranged rows of openings on the drum 120 for receiving the dogs that operate the valves 102 to 114, it is to be understood that any number of such contacts and rows of holes on drum 120 may be employed. In practice, it has been found that about forty such contacts on distributor 152 and longitudinally-disposed rows of holes on drum 120 are adequate for performing a cycle of operation necessary to complete the machining of an ordinary, relatively complex work piece.

A conductor 154 leads from the source of audio-frequency alternating current 134 to the bridge at a point between the condensers 139, 140 and the distributor 152. The other conductor 155 is connected to the bridge 135 between the resistances $R_1$ and $R_2$. At the junction between the legs 142 and 137 of the bridge 135, a conductor 156 is provided that extends to the one side of a primary coil 157 of a transformer. The opposite side of the primary 157 is connected to the bridge 135 between the legs 136 and 138.

The condenser 139, as previously mentioned, is of the plate type, the capacity of which is varied by a 180-degree rotation of its movable plates. Condenser 139 is fixed to the cross rail C and is provided with a worm gear 158 fixed to the shaft on which the movable plates of the condenser 139 are attached. The gear 158 meshes with a rotatable, axially-fixed gear 159. A shaft 160 is connected to the saddle S by a bracket 161. On the periphery of shaft 160, a spiral groove 162 is formed. The lineal extent of groove 162 is equal to the travel of the saddle S along the bearings 10 and 11 of the cross rail C. The angular disposition of groove 162 covers 180 degrees from its one end to its other end. The axially-fixed rotatable gear 159 is provided with a key number (not shown) that extends into the groove 162. The construction and arrangement of the parts are such that upon movement of the saddle S along the bearings 10 and 11 of the cross rail C, the groove 162 will impart a rotary movement to the gear 159 of 180 degrees throughout the maximum travel of the saddle S. This 180 degrees of rotation of the gear 159 will cause 180 degrees rotation of the gear 158 and consequently, the movable plates of the condenser 139.

The condenser 140 is intended to be operated in response to the movement of the head H along the saddle 12. Accordingly, the condenser 140, which is identical with the condenser 139, is mounted on a bracket 163 fixed to the saddle 12 so that the condenser 140 will move with the saddle. The condenser 140 is also provided with a gear 164 that meshes with a gear 165. The assembly is fixed relatively to the saddle 12. A shaft 166, having the same form of spiral groove 167 as groove 162 in the shaft 160, is fixed to the slide 15 by a bracket 168. Accordingly, movement of the slide 15 and the head H for its maximum distance along the bearings 16 and 17 of the saddle 12 causes the gear 165 to rotate through 180 degrees, thereby effecting 180 degrees movement of the movable plates of condenser 140.

The condensers 143 to 150 inclusive, are of the variable plate-type identical with, and each possesses the same capacity range as the condensers 139 and 140. The condensers 143 to 150 inclusive, are adapted selectively to be pre-set to any desired capacity. Accordingly, when the arm 153 of the distributor 152 engages any of the contacts 1 to 8 so as to include any of the condensers 143 to 150 in the leg 142 of the bridge 135, an unbalanced or balanced condition will be set up in the bridge 135 depending upon the position of the movable plates of the condenser 139 or 140, whichever is in the circuit of leg 138, and consequently upon the location of the head H. In the event an unbalanced condition exists in the bridge 135 by virtue of the condensers in the respective legs 138 and 142 being out of balance, a pre-determined voltage will appear across the primary 157 of the transformer. When the condensers that are connected into the circuit of legs 138 and 142 of the bridge 135 are in perfect balance, the voltage across each of the condensers will be the same. Since $R_1$ equals $R_2$, and both condensers are charged by the same frequency, they will both have the same impedance. Accordingly, the voltage across the resistances $R_1$ and $R_2$ will be equal and there will be zero voltage across the primary 157 of the transformer. When an unbalanced condition exists in the bridge circuit by virtue of the condensers in the respective legs 138 and 142 having different capacities due to the unbalanced condition of their movable plates, a pre-determined voltage will appear across the primary 157 of the transformer which will be induced into the secondary 169 of the transformer. The secondary 169 is connected to an amplifying unit 170 which is adapted to amplify any small change in voltage induced in the secondary 169 of the transformer. This amplified change in control voltage is fed to a tube 171 that is operated as a biased detector. When a control voltage is impressed on the grid of the tube 171, it draws current which energizes a solenoid 172 of a sensitive relay connected into its plate circuit. This flow of current extends from the source 175, that is grounded at 176, through solenoid 172 of the sensitive relay, thence through conductor 174 that leads to the plate of the tube 171, thence to the cathode of said tube, to a ground 173. Adjustment of either of the condensers 139 or 140, whichever is connected into the leg 138 of the bridge 135, by the movement of the head H along either of its paths of motion to a point where its capacitance equals that of the condenser 143 to 150 that is connected into the leg 142 of the bridge 135, causes the bridge 135 to become balanced and no voltage is impressed upon the primary 157 of the transformer. Accordingly, the control voltage is eliminated from the grid of the tube 171 and current ceases to flow through the solenoid 172, whereupon a spring 177 closes switch 178. The switch 178 includes two sets of contacts 179 and 180. Closing the contacts 179 permits current to flow from a ground 181 through the solenoid 132, generator G, a conductor 182 to a normally-closed switch 183, and thence through the closed contacts 179, a conductor 184, the normally-closed contacts 185 to a ground 186. Energization of the solenoid 132 will cause leftward movement of the valve 125 thereby permitting fluid under pressure to pass through the conduit 126 to the valve 127 and the line 133 to the valve mechanism 119. Operation of the valve mechanism 119 will immediately neutralize the piston mechanisms 67, 57, 63 and 58. Flow of fluid through the valve 127 and the line 124 causes downward movement of piston 123 and indexing of the function drum 120. Indexing of drum 120 causes indexing of the distributor arm 153 to its next succeeding contact. As the arm 153 leaves the contact with which it was engaged, an unbalanced condition in the bridge 135 will be created and, unless provision is otherwise made, current will be permitted to flow through the solenoid 172, thereby opening switch 179 before the drum 120 and the distributor 153 have completed an indexing movement. To overcome this condition, the contacts 180 are provided in the switch 178. Closing the contacts 180 short-circuits the solenoid 172 so that the unbalanced condition will cause the current to flow from the ground 176, through the source 175, thence through a conductor 187, normally-closed switch 188, another conductor 189, closed switch 180, conductor 174, tube 171 to the ground 173. Accordingly, the unbalanced condition of the bridge 135 due to the arm 153 moving off one contact into engagement with the next, has no effect on the switch 178. At the end of the downward movement of piston 123, switch 183 is caused to be opened in the same manner as the corresponding switch in the application Serial No. 541,986, above referred to. Opening the switch 183 de-energizes the solenoid 132, whereupon the spring 131 returns valve 125 to its normally-closed position, cutting off the flow of fluid under pressure to the line 124 and permitting the pressure from line 97 to move the piston 123 upwardly, re-setting it and switch 183 for the next succeeding indexing function. Additionally, at the end of the downward movement of piston 123 a cam 190 effects opening of the normally-closed switch 188, thereby re-introducing the solenoid 172 into the plate circuit of the tube 171 whereupon said solenoid is energized by virtue of the unbalanced condition of the bridge 135, thereby opening the switch 178. Switch 178 then remains open until the head H has moved in the direction determined by the next succeeding setting of the dogs on the drum 120 and until the selected condenser 139 or 140 has moved to a position where its capacity equals that of the condenser 143 to 150 that has been included into the leg 142 of the bridge 135 by the last indexing movement of the arm 153. When this occurs, solenoid 132 is again energized to effect the next indexing of the drum 120 and the distributor arm 153.

The head H includes a turret 191 that is adapted to support a plurality of tools for movement into and out of engagement with work. The turret 191 is mounted for rotation on a stud 192 fixed to the slide 15. Normally, the turret 191 is rigidly locked to the slide 15, but it is adapted to be released and indexed from station to station by a motor 193 fixed on the slide 15, all in the manner shown and described in application Serial Number 443,992, filed May 21, 1942, in the name of Edward P. Bullard, III, et al., now Patent No. 2,384,809, issued September 18, 1945. The turret 191 is adapted to be controlled from the function drum 120 by a double pole switch 194 in the same manner as the turret is operated in application Serial Number 541,986, filed June 24, 1944, in the name of E. P. Bullard, III, now Patent No. 2,528,736, issued November 7, 1950. Suffice it to say that closing switch 194 effects indexing of the turret 191 from one position to the other. At the conclusion of this turret index, function drum 120 is indexed to its next succeeding position and the turret driving motor 193 is re-set to provide another indexing movement of the turret 191 when called upon to do so by a dog on the drum 120.

Often, the work to be performed by the machine utilizes less than the total number of longitudinally-disposed series of holes about the drum 120, and before a succeeding cycle of operation may be performed, the drum 120 must be indexed back to its starting position. This is accomplished by providing a switch 195 in line with one of the circumferentially-disposed series of holes in the drum 120. The one pole of switch 195 is grounded, while the other pole is connected to a conductor 196, which latter is connected to conductor 210', thence through switch 183, conductor 182 leading to the source of energy G. Closing of the switch 195 by a dog on the drum 120 will cause energization of the solenoid 132 to move the valve 125 to index the drum 120 to its next succeeding position.

The machine to which this control mechanism is applied is adapted manually to be operated independently of the automatic control. Furthermore, during the setting up of the machine, it is desirable to cause it to stop at the completion of any function. Additionally, in the event anything occurs which might damage the machine, it is desirable to stop the machine instantly. These three conditions, as well as a fourth condition of automatic run, are each rendered effective by the operation of a single, manually-operable control lever 197 fixed to a shaft 198 that extends through the valves 98, 127 and a cam 199, all of which include portions fixed to the shaft 198. In the position shown in the drawing, the handle 197 is set for automatic run such that a cycle of operation set up on the drum 120 will automatically be performed by the successive indexing of the drum 120, which latter occurs only upon the completion of the last preceding function. The extent of each function is determined by the adjustment of the condensers 143 to 150, inclusive. Movement of the hand lever 197 to the position 200 will move the valve 127 to interrupt the communication between lines 126 and 124. Upon the completion of the function being performed when the handle 197 is moved to the position 200, energization of the solenoid 132 will operate the valve 125 to neutralize the operating structure of the transmission T, but the drum 120 will not be indexed due to the interruption of the flow of fluid under pressure from the line 126 to the line 124. Movement of the hand lever 197 to the position 201 will cause the cam 199 on the shaft 198 to close a switch 202. One pole of the switch 202 is grounded, and the other pole is connected to the conductor 182 leading to the generator G. Upon closing the switch 202, the solenoid 132 is instantly energized, operating the valve 125 and instantly stopping the movement of the head H without indexing the drum 120.

Movement of the hand lever 197 to the position 203 operates the valve 98 so that line 96 is exhausted through an undercut portion 204 of the valve 98 leading to an exhaust port 205. This exhausts all the neutralizing mechanisms including that for the clutch 26, the drop worm 47, and the traverse arms 53 and 54. It also exhausts the line 99 such that all of the valve plungers 102 to 114 descend out of operative position. Accordingly, the drum 120 may be indexed without causing operation of the transmission T. Additionally, movement of the handle 197 to the position 203 will operate valve 127 so that communication will be re-established between the lines 126 and 124.

The switch including contacts 135 also includes normally-open contacts 206 that are closed upon movement of the hand lever 197 to the position 203. One terminal of the contacts 206 is connected to a conductor 207 that leads to the line L2, while another conductor 208, connected to the other side of the contacts 206, is connected to one terminal of a push-button switch 209, the other terminal of which is connected to the motor 193. Accordingly, with the hand lever 197 in the position 203, the operator may at any time effect indexing of the turret 191 by simply closing the push-button switch 209.

The switch including contacts 185 also includes contacts 210 that are normally open, but which are closed by movement of handle 197 to the position 203. The one terminal of contacts 210 is connected through a conductor 211 to one side of a push-button switch 212, the opposite side of which is connected to the ground 186. The other terminal of contact 210 is connected to a conductor 210' that leads to the side of contacts 179 nearest switch 183 so that current flowing through contacts 210 must also pass through switch 183. Accordingly, with the hand lever 197 in the position 203, closing of the push-button switch 212 will effect indexing of the function drum 120 at the will of the operator. However, since the line 96 is exhausted through the valve 98 when the hand lever 197 is in the position 203, indexing of the drum 120 by closing push-button switch 212 will cause the transmission T to produce no function.

An arm 213 is connected to the shaft that supports the arm 153 of distributor 152, and is indexed in a step-by-step manner with arm 153. A contact 215 is located such that the arm 213 engages it when the arm 153 is at the zero position on distributor 152. In other words, when the arm 153 of distributor 152 is at its starting position between the contacts for the last function and the first function of the cycle of operation, arm 213 engages contact 215. At no other rotary position of the arm 213 will it engage contact 215. The contact 215 is connected to a conductor 216 that is attached to one pole of a push-button switch 217, the opposite pole of which is attached to a ground 214. Push-button switch 217 is the starting switch, and upon closing it when hand lever 197 is in its solid line position, current will flow from the ground 181 through the solenoid 132, the generator G, the line 182, the switch 183, arm 213, contact 215, line 216, the push-button switch 217 to the ground 214, thereby energizing the solenoid 132 and indexing the function drum 120, as well as the arm 153 of the distributor 152.

Although the various features of the improved control mechanism have been shown and described in detail to fully disclose one embodiment of the invention, it will be evident that numerous changes may be made in such details and certain features can be used without others, without departing from the principles of the invention.

What is claimed is:

1. Apparatus comprising in combination, a member; means for moving said member in either direction at any one of a plurality of speeds along a path; means for selecting the direction and speed of said member for successive movements along said path within a cycle of operation; an electrical bridge circuit adapted to be balanced when said member arrives at a pre-determined point in its path of travel; and means rendered effective upon the balancing of said bridge circuit for causing said selecting means to select a succeeding direction and speed of said member.

2. Apparatus comprising in combination, a member; means for moving said member in either direction at any one of a plurality of speeds along a path; means for selecting the direction and speed of said member for successive movements along said path within a cycle of operation; an electrical bridge circuit including variable-impedance means adapted to be balanced when said member arrives at a pre-determined point in its path of travel; and means rendered effective upon the balancing of said bridge circuit for causing said selecting means to select a succeeding direction and speed of said member.

3. Apparatus comprising in combination, a member; means for moving said member in either direction at any one of a plurality of speeds along a plurality of paths; means for selecting the path, direction and speed of said member for successive movements thereof along said paths within a cycle of operation; an electrical bridge circuit adapted to be balanced when said member arrives at a pre-determined point in any of its paths of travel; and means rendered effective upon the balancing of said bridge circuit for causing said selecting means to select a succeeding path, direction and speed of said member.

4. Apparatus comprising in combination, a member; means for moving said member in either direction at any one of a plurality of speeds along a plurality of paths; means for selecting the path, direction and speed of said member for successive movements thereof along said paths within a cycle of operation; an electrical circuit including an impedance bridge adapted to be balanced when said member arrives at a predetermined point in any of its paths; and means rendered effective upon the balancing of said bridge circuit for causing said selecting means to select a succeeding path, direction and speed of said member when said member arrives at a pre-determined point in any of its paths of travel.

5. Apparatus comprising in combination, a member; means for moving said member in either direction at any one of a plurality of speeds along a plurality of paths; means for selecting the path, direction and speed of said member for successive movements thereof along said paths within a cycle of operation; an electrical circuit including a variable-impedance bridge adapted to be balanced when said member arrives at a predetermined point in any of its paths; and means rendered effective upon the balancing of said bridge circuit for causing said selecting means to select a succeeding path, direction and speed of said member when said member arrives at a pre-determined point in any of its paths of travel.

6. Apparatus comprising in combination, a member; means for moving said member in either direction at any one of a plurality of speeds along a plurality of paths; means for selecting the path, direction and speed of said member for successive movements thereof along said paths within a cycle of operation; a biased detector circuit; a bridge circuit adapted to cooperate with said biased detector circuit, and adapted to be balanced when said member arrives at a pre-determined point in any of its paths of travel; and means rendered effective upon the balancing of said bridge circuit for causing said selecting means to select a succeeding path, direction and speed of said member.

7. Apparatus comprising in combination, a member; means for moving said member in either direction at any one of a plurality of speeds along a plurality of paths; means for selecting the path, direction and speed of said member for successive movements thereof along said paths within a cycle of operation; an electrical impedance bridge circuit including a source of current at audio frequency; means for balancing said bridge circuit when said member arrives at a pre-determined point in any of its paths of travel; and means rendered effective upon the balancing of said bridge circuit for causing said selecting means to select a succeeding path, direction and speed of said member.

8. Apparatus comprising in combination, a member; means for moving said member in either direction along one or more paths at any one of a plurality of speeds any number of times within a cycle of operation; means adapted successively to be rendered effective to select the speed, path and direction of each motion of said member within said cycle of operation; an electrical bridge circuit including separate pre-settable impedance means for each motion of said member within said cycle; and separate impedance means for each path along which said member is adapted to be moved, responsive to the movement of said member and adapted to cooperate with any of said pre-settable impedance means when said member arrives at a pre-determined point in any of its paths of motion to cause said bridge to become balanced to render effective said selecting means to select the next succeeding path, direction and speed of motion of said member within said cycle of operation.

9. Apparatus comprising in combination, a member; means for moving said member in either direction along one or more paths at any one of a plurality of speeds any number of times within a cycle of operation; means adapted successively to be rendered effective to select the speed, path and direction of each motion of said member within said cycle of operation; a capacitance bridge circuit including separate pre-settable means for each motion of said member within said cycle; and separate means for each path along which said member is adapted to be moved, responsive to the movement of said member and adapted to cooperate with any of said pre-settable means when said member arrives at a pre-determined point in any of its paths of motion to cause said circuit to render effective said selecting means to select the next succeeding path, direction and speed of motion of said member within said cycle of operation.

10. Apparatus comprising in combination, a member; means for moving said member in either direction along one or more paths at any one of a plurality of speeds any number of times within a cycle of operation; means adapted successively to be rendered effective to select the speed, path and direction of each motion of said member within said cycle of operation; an electrical bridge circuit including separate pre-settable variable-capacitance means for each motion of said member within said cycle; and separate means for each path along which said member is adapted to be moved, responsive to the movement of said member and adapted to cooperate with any of said pre-settable variable-capacitance means when said member arrives at a pre-determined point in any of its paths of motion to cause said bridge to become balanced to render effective said selecting means to select the next succeeding path, direction and speed of motion of said member within said cycle of operation.

11. Apparatus comprising in combination, a member; means for moving said member in either direction along one or more paths at any one of a plurality of speeds any number of times within a cycle of operation; means adapted successively to be rendered effective to select the speed, path and direction of each motion of said member within said cycle of operation; an electrical bridge circuit including separate pre-settable impedance means for each motion of said member within said cycle; a biased detector circuit; and separate impedance means for each path along which said member is adapted to be moved, responsive to the movement of said member and adapted to cooperate with any of said pre-settable impedance means when said member arrives at a pre-determined point in any of its paths of motion to cause said biased detector circuit to render effective said selecting means to select the next succeeding path, direction and speed of motion of said member within said cycle of operation.

12. Apparatus comprising in combination, a member; means for moving said member in either direction along one or more paths at any one of a plurality of speeds any number of times within a cycle of operation; means adapted successively to be rendered effective to select the speed, path and direction of each motion of said member within said cycle of operation; an electrical bridge circuit including a source of current at audio frequency and separate pre-settable impedance means for each motion of said member within said cycle; and separate impedance means for each path along which said member is adapted to be moved responsive to the movement of said member and adapted to cooperate with any of said pre-settable impedance means when said member arrives at a pre-determined point in any of its paths of motion to cause said circuit to render effective said selecting means to select the next succeeding path, direction and speed of motion of said member within said cycle of operation.

13. Apparatus adapted to produce a plurality of functions; a control member for said apparatus including a plurality of portions, each adapted selectively to be set for causing said apparatus to produce one of said functions; an electrical bridge circuit including a plurality of impedance means, one for each of said portions, adapted to cooperate with other impedance means responsive to said functions at any point within the extent of said functions for balancing said bridge circuit; and a biased detector circuit acted upon by said bridge circuit for rendering effective the next succeeding portion of said control member.

14. Apparatus adapted to produce a plurality of functions; a control drum for said apparatus including a plurality of portions, each adapted selectively to be set for causing said apparatus to produce one of said functions; an electrical bridge circuit including a plurality of impedance means, one for each of said portions, adapted to cooperate with other impedance means responsive to said functions at any point within said functions for balancing said bridge circuit; and a biased detector circuit acted upon by said bridge circuit for controlling means for indexing said drum to render effective successive of said portions.

15. Apparatus adapted to produce a plurality of functions; a control member for said apparatus including a plurality of portions, each adapted selectively to be set for causing said apparatus to produce one of said functions; an electrical bridge circuit including a plurality of capacitance means, one for each of said portions, adapted to cooperate with other capacitance means responsive to said functions at any point within said functions for balancing said bridge circuit; and a biased detector circuit acted upon by said bridge circuit for rendering effective successive of said portions.

16. Apparatus adapted to produce a plurality of functions; a control member for said apparatus including a plurality of portions, each adapted selectively to be set for causing said apparatus to produce one of said functions; an electrical impedance bridge circuit including a plurality of manually-operable variable-impedance means, one for each of said portions; other variable-impedance means responsive to said functions at any point within said functions adapted to cooperate with any of said plurality of manually-operable impedance means for balancing said bridge circuit; and a biased detector circuit acted upon by said bridge circuit for rendering effective successive of said portions.

17. Apparatus adapted to produce a plurality of functions; a control member for said apparatus including a plurality of portions, each adapted selectively to be set for causing said apparatus to produce one of said functions; an electrical capacitance bridge circuit including a source of current at audio frequency and a plurality of manually-operable variable-capacitance means, one for each of said portions; other variable-capacitance means responsive to said functions at any point within said functions adapted to cooperate with any of said plurality of manually-operable capacitance means for balancing said bridge circuit; and a biased detector circuit acted upon by said bridge circuit for rendering effective successive of said portions.

18. Apparatus adapted to produce a plurality of functions; a control member for said apparatus including a plurality of portions, each adapted selectively to be set for causing said apparatus to produce one of said functions; an electrical bridge circuit including a plurality of variable plate condensers, one for each of said portions, adapted to cooperate with means responsive to said functions at any point within said functions for balancing said bridge circuit; and a biased detector circuit acted upon by said bridge circuit for rendering effective successive of said portions.

19. Apparatus adapted to produce a plurality of functions; a control member for said apparatus including a plurality of portions, each adapted selectively to be set for causing said apparatus to produce one of said functions; an electrical bridge circuit including a plurality of variable plate condensers, one for each of said portions, adapted to cooperate with a similar plate condenser responsive to said functions at any point within said functions for balancing said bridge circuit; and a biased detector circuit acted upon by said bridge circuit for rendering effective successive of said portions.

20. Apparatus adapted to produce a plurality of functions; a control member for said apparatus including a plurality of portions, each adapted selectively to be set for causing said apparatus to produce one of said functions; an electrical bridge circuit including a source of current at audio frequency and a plurality of variable plate condensers, one for each of said portions; another variable plate condenser responsive to said functions at any point within said functions for balancing said bridge circuit; and a biased detector circuit acted upon by said bridge circuit for rendering effective successive of said portions.

21. Apparatus comprising in combination, a plurality of manually-operable impedance means; a distributor adapted selectively to connect each of said impedance means into one leg of an electrical bridge circuit; a biased detector circuit adapted to be acted upon by said bridge circuit; a member; means for moving said member; other impedance means responsive to the movement of said member adapted to cooperate with said manually-operable impedance means when said member arrives at a pre-determined point as dictated by the setting of said manually-operable impedance means for operating said biased detector circuit for energizing an auxiliary circuit; and means operated by said auxiliary circuit.

22. Apparatus comprising in combination, a plurality of manually-operable plate condenser means; a distributor adapted selectively to connect each of said condenser means into one leg of an electrical bridge circuit; a source of audio frequency current impressed across said bridge circuit; a biased detector circuit adapted to be acted upon by said bridge circuit; a member; means for moving said member; separate plate condenser means responsive to the movement of said member adapted to cooperate with said manually-operable plate condenser means when said member arrives at a pre-determined point as dictated by the setting of said manually-operable plate condenser means for balancing said bridge circuit; means responsive to the balancing of said bridge circuit for operating said biased detector circuit to energize an auxiliary circuit; and means operated by said auxiliary circuit.

23. In a machine tool, a tool head adapted to be moved in either direction along a path of travel; pre-settable control means having a plurality of stations, each adapted to be rendered effective by a step-by-step indexing mechanism for controlling the direction, rate and extent of movement of said head along said path; an electronic circuit adapted to cooperate with said pre-settable means; said pre-settable means being adapted to provide a predetermined signal voltage in said electronic circuit for each station to which it is indexed; means responsive to the movement of said tool head for nullifying said signal voltage; and means responsive to the null condition of said circuit for causing said pre-settable means to be indexed to its next succeeding station.

24. In a machine tool, a tool head adapted to be moved in either direction along a plurality of paths; pre-settable control means having a plurality of stations, each adapted to be rendered effective by a step-by-step indexing mechanism for controlling the path, direction, rate and extent of movement of said tool head; an electronic circuit adapted to cooperate with said pre-settable control means and adapted to have impressed upon it predetermined signal voltages by said pre-settable control means for each station thereof; means responsive to the movement of said tool head for balancing said signal voltages; and means responsive to the balancing of said signal voltages for causing said pre-settable control means to be indexed to its next succeeding station.

ROBINSON D. BULLARD.
JOHN H. SHERWOOD.
PAUL M. GEIST.

(References on following page)

REFERENCES CITED

The following references are of record in the file of this patent:

UNITED STATES PATENTS

| Number | Name | Date |
|---|---|---|
| 1,586,233 | Anschutze-Kaempfe | May 25, 1926 |
| 1,879,388 | Mershon | Sept. 27, 1932 |
| 1,916,706 | Wittkuhns et al. | July 4, 1933 |
| 2,002,353 | Reinken | May 21, 1935 |
| 2,111,786 | Knight | Mar. 22, 1938 |
| 2,116,593 | Bouvier et al. | May 10, 1938 |
| 2,135,991 | Nessell | Nov. 8, 1938 |
| 2,229,450 | Garman | Jan. 21, 1941 |
| 2,316,875 | Laboulais | Apr. 20, 1943 |
| 2,352,185 | Bullard 3rd et al. | June 27, 1944 |
| 2,427,493 | Bullard 3rd | Sept. 16, 1947 |

FOREIGN PATENTS

| Number | Country | Date |
|---|---|---|
| 250,957 | Great Britain | Dec. 9, 1926 |